(12) United States Patent
Dominiak et al.

(10) Patent No.: US 10,486,089 B2
(45) Date of Patent: Nov. 26, 2019

(54) METHOD AND SYSTEM FOR FILTRATION AND FILTRATION CAKE LAYER FORMATION

(75) Inventors: Dominik Marek Dominiak, Århus N (DK); Tom Bjerregaard Jæger, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 1588 days.

(21) Appl. No.: 14/009,621

(22) PCT Filed: Mar. 27, 2012

(86) PCT No.: PCT/DK2012/050093
§ 371 (c)(1),
(2), (4) Date: Nov. 20, 2013

(87) PCT Pub. No.: WO2012/136214
PCT Pub. Date: Oct. 11, 2012

(65) Prior Publication Data
US 2014/0124460 A1    May 8, 2014

(30) Foreign Application Priority Data

Apr. 5, 2011 (DK) .................................. 2011 70160

(51) Int. Cl.
*B01D 29/00* (2006.01)
*C02F 3/00* (2006.01)
(Continued)

(52) U.S. Cl.
CPC ..... *B01D 29/0002* (2013.01); *B01D 29/0075* (2013.01); *B01D 29/03* (2013.01);
(Continued)

(58) Field of Classification Search
None
See application file for complete search history.

(56) References Cited

U.S. PATENT DOCUMENTS 3,715,191 A * 2/1973 Rushton ................. B01D 33/19
210/521
3,770,624 A * 11/1973 McKibben ............ C02F 3/1242
210/196
(Continued)

FOREIGN PATENT DOCUMENTS

CN    1426379 A    6/2003
CN    1535170 A    10/2004
(Continued)

*Primary Examiner* — Amber R Orlando
*Assistant Examiner* — Brit E. Anbacht
(74) *Attorney, Agent, or Firm* — Knobbe Martens Olson & Bear, LLP (57) ABSTRACT

The present invention relates to a method of filtering a feed and waste water treatment system using the filtration method. The method utilizes a filtration cake for the filtration, which filtration cake is formed by elements contained in a liquid having a different composition than the feed to the filtered. The invention relates in particular to a method for filtering a liquid containing solid particles of different sizes which utilizes a filtration cake formed at least partly and preferably only from particles contained in said liquid containing solid particles of different sizes. The particles of the filtration cake are deposited on a filtration cake support and the method involves separation of the liquid containing solid particles of different sizes into two fractions: one fraction containing solid particles above a certain size and one containing smaller particles, and filtering the fraction containing smaller particles through the filtration cake. According to preferred aspects of the invention, the feed to be filtered is activated sludge supernatant and the filtration cake is formed from floes of an activated sludge mixed liquor.

23 Claims, 7 Drawing Sheets (51) Int. Cl.
  *C02F 3/12*  (2006.01)
  *B01D 29/03* (2006.01)
  *B01D 29/64* (2006.01)
  *B01D 29/82* (2006.01)

(52) U.S. Cl.
  CPC ............. *B01D 29/64* (2013.01); *B01D 29/82* (2013.01); *C02F 3/006* (2013.01); *C02F 3/121* (2013.01); *C02F 3/1215* (2013.01); *C02F 2209/03* (2013.01); *C02F 2209/08* (2013.01); *C02F 2209/10* (2013.01); *C02F 2209/11* (2013.01); *C02F 2209/20* (2013.01); *C02F 2209/44* (2013.01); *Y02W 10/15* (2015.05)

(56) References Cited

U.S. PATENT DOCUMENTS

| | | | | |
|---|---|---|---|---|
| 4,046,690 | A | * | 9/1977 | Rodgers ................. B01D 37/00 210/193 |
| 4,192,743 | A | * | 3/1980 | Bastgen ................. B01D 33/04 210/712 |
| 4,390,428 | A | * | 6/1983 | Bratten ................. B01D 29/096 210/400 |
| 4,528,103 | A | * | 7/1985 | Spilkin ................. B01D 29/114 210/313 |
| 4,539,097 | A | * | 9/1985 | Kelterborn ........... B01D 11/023 208/390 |
| 5,308,501 | A | * | 5/1994 | Eckert ....................... C02F 9/00 205/755 |
| 6,505,744 | B1 | * | 1/2003 | Geaugey ................. B01D 29/39 210/154 |
| 6,517,723 | B1 | * | 2/2003 | Daigger ................... C02F 3/006 210/196 |
| 2002/0074287 | A1 | | 6/2002 | Park et al. |
| 2003/0042209 | A1 | | 3/2003 | Mori et al. |
| 2003/0121852 | A1 | * | 7/2003 | Katsu .................... C02F 3/1273 210/609 |
| 2004/0188361 | A1 | * | 9/2004 | Katsu ..................... B01D 29/15 210/791 |
| 2004/0238441 | A1 | * | 12/2004 | Tanaka .................... C02F 3/121 210/605 |
| 2005/0027021 | A1 | * | 2/2005 | Espinoza ............... B01D 29/15 518/726 |
| 2008/0087607 | A1 | | 4/2008 | Langlais et al. |
| 2014/0061126 | A1 | * | 3/2014 | Dominiak ............... C02F 3/006 210/609 |

FOREIGN PATENT DOCUMENTS

| | | |
|---|---|---|
| CN | 1541190 A | 10/2004 |
| CN | 1625428 A | 6/2005 |
| EP | 0220749 | 5/1987 |
| EP | 1270514 | 1/2003 |
| EP | 1873123 | 1/2008 |
| FR | 2775911 | 9/1999 |
| JP | 2002126469 | 5/2002 |
| JP | 2004167393 | 6/2004 |
| JP | 2004305807 | 11/2004 |
| WO | WO 2003/089103 | 10/2003 |

\* cited by examiner

METHOD AND SYSTEM FOR FILTRATION
AND FILTRATION CAKE LAYER
FORMATION

CROSS REFERENCE TO RELATED APPLICATIONS

This application is a U.S. National Phase Application of PCT International Application Number PCT/DK2012/050093, filed on Mar. 27, 2012, designating the United States of America and published in the English language, which is an International Application of and claims the benefit of priority to Danish Patent Application No. PA 2011 70160, filed on Apr. 5, 2011. The disclosures of the above-referenced applications are hereby expressly incorporated by reference in their entireties.

FIELD OF THE INVENTION

The present invention relates to a method of filtering a feed and waste water treatment system using the filtration method. The method utilizes a filtration cake for the filtration, which filtration cake is formed by elements contained in a liquid having a different composition than the feed to the filtered. The invention relates in particular to a method for filtering a liquid containing solid particles of different sizes which utilizes a filtration cake formed at least partly and preferably only from particles contained in said liquid containing solid particles of different sizes. The particles of the filtration cake are deposited on a filtration cake support and the method involves separation of the liquid containing solid particles of different sizes into two fractions: one fraction containing solid particles above a certain size and one containing smaller particles, and filtering the fraction containing smaller particles through the filtration cake. According to preferred aspects of the invention, the feed to be filtered is activated sludge supernatant and the filtration cake is formed from flocs of an activated sludge mixed liquor.

BACKGROUND AND OBJECTS OF THE INVENTION

It is well known that filters in a waste water treatment process carried out in e.g. a Membrane Bio Reactor (MBR) suffer from the drawbacks of fouling and clogging leading to limited and even no flow through the filters. Filtering is often provided by micro- or ultra-filtration membranes having very high production costs, and at the same time quite fragile filter designs. The high production costs stipulate regeneration of the membrane, which is provided by back-flushing, chemical or enzymatic cleaning.

Recent developments (See e.g. Characteristics of a Self-Forming Dynamic Membrane Coupled with a Bioreactor for Municipal Waste water Treatment, Environ. Sci. Technol. 2002, 36, 5245-5251) suggest that the layer of biomass on a coarse mesh improves a solid-liquid separation. In the suggested method, the thickness of the biomass layer grows continuously during filtration. In order to control growth, bottom aeration is used to continuously lift some solids from the surface and the biomass layer and to keep the thickness more or less constant.

Thickness of the fouling layer on the membrane depends on many factors: coarse bubble aeration rate, filter module geometry, sludge properties etc. so it is very hard to choose optimum conditions; in fact, the cake, or in general the biomass layer, forms more or less spontaneously, so its rejection capabilities are to a large extent undefined. Also, membrane coarse bubble aeration is one of the largest contributors to operating costs of an MBR, and membranes need chemical cleaning, which is both expensive and complicated.

An example of such a waste water treatment system is disclosed in JP 2004167393 which disclose a system in which a filter surface is exposed to gas bubbles by use of a diffuser arranged below a filter element to keep the filter elements clean.

Hence, an improved means of achieving biomass retention in a waste water treatment process would be advantageous, and in particular a more efficient and/or reliable filtration would be advantageous.

It is a further object of the present invention to provide an alternative to the prior art. In particular, it may be seen as an object of the present invention to provide devices, systems and methods that solve the above mentioned problems of the prior art with a new method for achieving membrane-quality filtration with compressed biomass.

SUMMARY OF THE INVENTION

Thus, the above described object and several other objects are intended to be obtained by the various aspects of the invention which in a first aspect relates to a method for filtering a liquid containing solid particles of different sizes. The method utilizing a filtration cake formed at least partly and preferably only from particles contained in the liquid containing solid particles of different sizes and these solid particles are deposited on a filtration cake support being a porous member as a porous layer forming the filtration cake. The filtration cake and support allow liquid to flow through the filtration cake to provide a filtrate, and the method comprising separating the liquid containing solid particles of different sizes into two fractions: one fraction containing solid particles above a certain size and one containing smaller solid particles, and providing a flow of the fraction comprising the smaller particles towards and through the filtration cake (18) in a direction towards and through the cake support (4), thereby providing a filtering of the fraction containing smaller solid particles.

In the present context, a number of terms are used in a manner being ordinary to the skilled person. However, some of these terms are explained below:

Solid particles of different sizes is preferably used to mean particles of activated sludge mixed liquor which range in size from approximately 1 micrometer (single bacteria cells) to above 1 millimeter (aggregates of activated sludge flocs, large inorganic particles). The "size" is typically used in a manner being ordinary to definitions of particles' sizes, such as e.g. a diameter in a conventional manner such as a volume based particle size which equals the diameter of a sphere that has same volume as a given particle. "Particle" is preferably used to include activated sludge flocs and aggregates thereof and other solid elements present in a fluid. Solid is preferably used to mean a substance which is not a liquid or a gas.

Porous preferably used to mean a property of a material that allows it to pass a fluid through, if a pressure difference is applied.

Above a certain size is preferably used to mean the larger particles of activated sludge mixed liquor which settle significantly faster that the small particles found in the activated sludge supernatant. While the limit of "a certain size" typically and preferably is defined by e.g. the separation technique, where the distinction is made between e.g. settling and unsettling particles, the limit may be preselected. A typical value for the limit may be 10 micrometers.

Activated sludge flocs is preferably used to mean microbial aggregates forming majority of activated sludge mixed liquor suspended solids. In addition Activated sludge flocs is also preferably used to mean bacterial aggregates constituting the settleable fraction of the activated sludge mixed liquor, made up by bacteria, protozoa and other particles held together (like glue) by extracellular polymeric substances produced by bacteria.

Activated sludge mixed liquor is preferably used to mean mixture of activated sludge flocs and activated sludge supernatant present in the process tank or tanks of an installation performing wastewater treatment according to the activated sludge process. Accordingly, activated sludge mixed liqour is preferably a mixture of liquid, typically being water, and mass of biological flocs.

Activated sludge supernatant is preferably used to mean the top fraction of the activated sludge mixed liquor remaining after settling of the activated sludge flocs, containing the unsettleable particles and few activated sludge flocs. The settling is typically and preferably carried out until a top fraction of activated sludge supernatant is distinct, such as visually distinct. Accordingly, Activated sludge supernatant is preferably the water phase resulting from settling, centrifugation or in general separation of activated sludge mixed liqour, by separating out e.g. flocs and/or other solid elements contained in the activated sludge mixed liquor. The separation provides an activated sludge mixed liquor bottom fraction, which can be characterised as having a higher concentration of flocs than the unseparated active sludge mixed liquor.

Cake particle removal mechanism is preferably used to mean the mechanism of removing particles by the filtration cake. Such a filtration cake is typically composed of activated sludge flocs capable of removing the particles present in activated sludge supernatant through a process of depth filtration. Small particles from the activated sludge supernatant enter the porous filtration cake and get adsorbed to the surface of the activated sludge flocs forming the cake. Adsorption of these particles contributes to the decrease of the internal porosity of the filtration cake and therefore the increase of the pressure drop across the cake. The pressure drop across the cake is additionally increased by the progressing collapse of the filtration cake caused by the compressible nature of the activated sludge flocs (cf. also FIG. 3 herein).

In general, the filtration cake is preferably made by deposition of particles on the filtration cake support from the liquid containing solid particles of different sizes. In this respect, deposition of particles from a liquid typically means that the particles originally are contained in the fluid and are "moved" from the fluid to a position on the cake support.

In preferred embodiments of the invention, the filtration cake may be made by deposition of particles on the filtration cake support from the fraction of the liquid containing solid particles of different sizes, which contains solid particles above a certain size.

The liquid containing solid particles of different sizes may preferably be activated sludge mixed liquor, the fraction comprising the smaller particles may preferably be activated sludge supernatant, and wherein the solid particles above a certain size may preferably be activated sludge flocs. Further, the liquid containing solid particles of different sizes may be biologically untreated waste water.

In preferred embodiments, the activated sludge mixed liquor may preferably be activated sludge mixed liquor from a biological waste water treatment process.

Further, the activated sludge supernatant may be provided by settling an activated sludge mixed liquor, preferably being biologically treated municipal or industrial waste water present in a system treating municipal or industrial wasterwaster.

The filtration cake may preferably be provided by flocs contained in the activated sludge mixed liquor and in some embodiments also by coagulated substances provided by adding a coagulant to the sludge. In some embodiments, the filtration cake may be provided solely by flocs from the activated sludge mixed liquor, although the invention is not considered limited to such situations.

In preferred embodiments, the filtration cake may be formed on a backing layer on the cake support. The backing layer may preferably comprise paper, a net or similar, having pore sizes allowing filtrate to pass through while allowing build-up of the filtration cake, and wherein the cake is removed together with the backing layer.

Methods according to the present invention may further comprise removal of the filtration cake. Such removal may preferably comprise the step of providing a flow of liquid through the cake support directed towards the filtration cake (18) which in many cases removes the filtration cake from the cake support.

The removal of filtration cake or residues thereof may further comprise removal mechanical actions such as scraping, a chemical action, a flow of air bubbles, thermal action, sonication with ultrasound or any other means designed to separate the cake from the support.

Methods according to the invention may further comprise returning the removed filtration cake to a process tank containing activated sludge mixed liquor or in general the fluid containing solid particles of different sizes.

Preferred embodiments of the invention further comprise establishment of the filtration cake and the establishment may preferably comprise
providing
a flow of liquid towards the filtration cake support, the liquid being the liquid containing solid particles of different sizes or the fraction containing solid particles above a certain size,
a pressure difference across the filtration cake support and the flocs when deposited thereon, to provide a flow of liquid through the filtration cake support and the flocs deposited thereon;
until a filtration cake has been formed.

Establishment of a filtration cake according to the present invention may further comprise flushing a region in front of the filtration cake by the fraction containing smaller particles thereby removing the liquid used during establishment of the filtration cake.

The pressure difference across the filtration cake support and the flocs when deposited thereon during establishment of filtration cake may be below 1 bar, such as below 0.5 bar, or even lower than 0.1 bar, and even more preferably between 0 and 200 mbar. In preferred embodiments of the invention, the pressure difference during the establishment of filtration cake varies according to a specified profile, e.g. such that allows the flow across the filter support to be constant during cake establishment.

According to preferred embodiments of the invention, the pressure difference during the establishment of filtration cake may constant over time, or the flow of liquid through the filtration cake and filtration cake support during the establishment of filtration cake is constant over time, or both flow and pressure change over time according to a predefined profile.

Preferably, the filtration cake may be defined to have been formed when the mass of solids per unit area of the cake support has reached a preselected level. According to preferred embodiments of the invention, the preselected level may be selected within 0.05 to 10 kg dry solids per square meter.

In other embodiments, the pressure difference across the filtration cake support and the flocs when deposited thereon during the establishment of filtration cake is increased over time. Preferably, the filtration cake is defined to have been formed, when the pressure difference has reached a preselected level.

Preferred embodiments of the invention may further comprise determining one or more parameters, such as turbidity, suspended solids concentration, total bacteria count, total organic carbon concentration, chemical oxygen demand (COD) of the liquid having passed through the cake support and the filtration cake, the determining being done by measuring and/or calculating.

Preferably, the method may further comprise capturing the filtration cake or the particles thereof after it has been used for filtering the fraction containing smaller solid particles. A filtration cake captured after it has been used represents dewatered sludge and the present invention thereby provides the effects of dewatering sludge and removing the used filtration cake from the wastewater treatment system as surplus activated sludge.

In many preferred embodiments, the method of filtration comprises a cyclic repetition of
  establishment of filtration cake,
  filtering of the fraction containing smaller solid particles, and
  removal of the filtration cake.

In a second aspect, the invention forms part of a waste water treatment method.

In a third aspect, the invention preferably relates to a filtration system comprising
  a process tank for containing a liquid containing solid particles of different sizes,
  a separation unit for receiving liquid from the process tank and separating the liquid containing solid particles of different sizes into fractions: one fraction containing solid particles above a certain size and one containing smaller particles, and
  a filtration unit having two cavities and a porous cake support allowing liquid to flow between the two cavities only through the cake support and filtration cake,
the filtration system further comprising
  liquid connection lines for feeding the liquid containing solid particles of different sizes and/or the fraction containing solid particles above a certain size to the same cavity of the filtration unit,
  control valves, such as shut off valves to control whether the liquid to be filtered, the fraction containing solid particles above a certain size or the fraction containing smaller particles is fed to said cavity of the filtration unit.

In preferred embodiments, the liquid containing solid particles of different sizes may be activated sludge mixed liquor and the two fractions may be activated sludge mixed liquor with a higher concentration and activated sludge supernatant.

The system may further comprise a backing layer on the cake support, the backing layer preferably comprises paper, a net or similar, having pore sizes allowing filtrate to pass through while allowing build-up of the filtration cake.

As presented above, the liquid containing solid particles of different sizes are typically separated into fractions: one fraction containing solid particles above a certain size and one containing smaller solid particles. In many of the preferred embodiments, these two fractions are the only two fraction into which the liquid is separated although the liquid may be separated into further fractions.

Further embodiments of the invention are presented in the below disclosure as well as in the claims.

The various aspects of the present invention may each be combined with any of the other aspects. These and other aspects of the invention will be apparent from and elucidated with reference to the embodiments described hereinafter.

BRIEF DESCRIPTION OF THE FIGURES

The invention and in particular preferred embodiments thereof will now be described in more detail with regard to the accompanying figures. The figures show ways of implementing the present invention and are not to be construed as being limiting to other possible embodiments falling within the scope of the attached claim set.

FIG. 1 shows schematically an implementation according to the present invention, FIGS. 2a and b each shows schematically profiles for pressure, P, flow, Q, and filtration cake amount in terms of dry matter, w, (measured in kilograms of cake dry matter/unit area) (kg/m2).

FIG. 4 shown in particular an embodiment of the invention in which the filtration cake is designed (engineered) to meet a certain constraint on the filtrate quality (noted as a dotted vertical line in the $C_f$ graph).

DETAILED DESCRIPTION OF EMBODIMENTS

Figure 1:
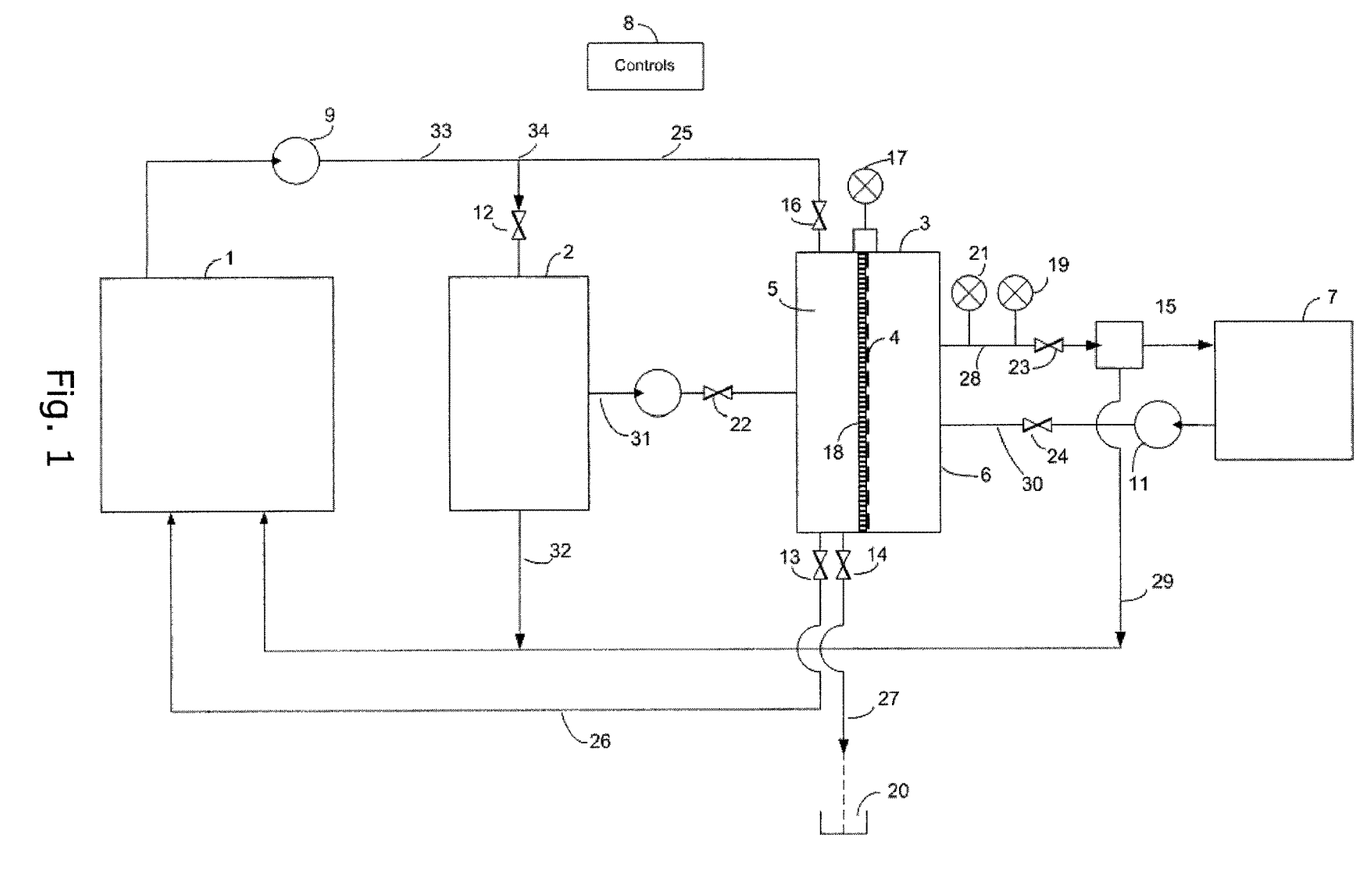

With reference to FIG. 1 an implementation of the present invention will now be disclosed. It is noted that the implementations disclosed herein relate to examples of the invention and are not to be construed as limiting the scope of the invention.

FIG. 1 discloses in a schematical manner a waste water treatment system I. The system I comprises a process tank 1, a separation unit 2, a filtration unit 3 and a filtrate tank 7.

Waste water, such as municipal or industrial waste water, is treated biologically in the process tank 1 and activated sludge mixed liquor is thereby present in the tank 1. The activated sludge mixed liquor may flow to the separation unit 2 by use of the pump 9 in the liquid connection line 33 between the process tank 1 and the separation unit 2. The flow into the separation unit 2 may be cut off by use of the valve 12. The liquid connection line 33 comprising a bifurcation 34 with a liquid connection line 25 with shut off valve 16. The liquid connection line 25 enables activated sludge mixed liquor to flow to cavity 5 of the filtration unit 3 by use of the pump 9. Inflow of activated sludge mixed liquor to the filtration unit 3 may be cut off by use of the shut off valve 16.

The separation unit 2 is typically embodied as a settling tank in which the activated sludge mixed liquor is separated by settling into activated sludge mixed liquor with a higher concentration of flocs and activated sludge supernatant above the activated sludge mixed liquor with higher concentration. It is noted that although the embodiment of FIG. 1 uses a separation technique involving settling, other separation techniques, such as centrifugation, filtering or the like, may be applied.

Thus, the embodiment disclosed in FIG. 1 relates to an example where a liquid containing solid particles of different sizes is activated sludge mixed liquor being contained in the process tank. Further, the liquid containing solid particles of different sizes is separated into two fractions by the separation unit 2:

- a fraction containing solid particles above a certain size, that is the thickened activated sludged mixed liquor in the separation unit 2 produced by the settling process and fed back to the process tank 1 through the fluid connection line 32,
- a fraction containing smaller solid particles, that is the activated sludge supernatant produced by the settling process and fed to the filtration unit through fluid connection line 31.

The filtration unit 3 is embodied as a container having a filtration cake support 4 which divides the interior of the filtration unit 3 into a cavity 5 receiving activated sludge mixed liquor or activated sludge supernatant (via liquid connection line 31 as will be disclosed in details below), and a cavity 6 receiving filtrate through a filtration cake 18 formed on the filtration cake support 4. It is noted that the liquid passing through the cake support 4 and into the cavity 6 is termed filtrate irrespective of whether a filtration cake 18 is present on the cake support 4 or not. Pressure difference between the cavity 5 and cavity 6 may be measured by the pressure sensor 17.

Filtration cake support 4 is a porous member in which the porosity is provided by a net supported by a frame or similar support structure to keep the net stretched. The net could be a fabric, wire mesh or similar which provides openings to allow liquid to pass through, while preventing flocs and/or particles from going through. Thus, the net has a mesh size sufficient to prevent particles and/or flocs of a certain size to pass through. The mesh size is preferably in the order of 1-100 micron times 1-100 micron and the net is preferably made as a woven or non-woven fabric produced from paper, synthetic or natural fibers or metal, such as stainless steel mesh. Furthermore, the filtration cake support 4 may be provided by a structure with a coarse mesh and the mesh size being sufficient to prevent particles and/or flocs to go through is provided by arranging a backing layer on the coarse mesh structure. The backing layer preferably comprises paper, a net or similar, having pore sizes allowing filtrate to pass through while allowing build-up of the filtration cake.

Two outlets 13 and 14 each having a shut off valve are provided from the cavity 5. The outlet 13 is connected to the process tank 1 via liquid connection line 26 so that liquid may flow from the cavity 5 to the process tank 1. The outlet 14 is connected via liquid connection line 27 to a reservoir 20, typically being a reservoir for storing liquid, so that liquid may flow from the cavity 5 to the reservoir 20.

A liquid connection line 28 between the cavity 6 and the filtrate tank 7 is provided. The liquid connection line 28 comprising a three way valve 15, whereby filtrate may flow from the cavity 6 to a three way valve 15 which leads the filtrate to either a filtrate tank 7 or back to the process tank 1 through liquid connection line 29—the purpose of the three way 15 valve will be disclosed in further details below. The amount of filtrate flowing out of the filtration unit 3 is determined by the flow meter 21 and the turbidity of the filtrate is determined by the turbidity sensor 19. It is noted that the position of the flow meter 21 and the turbidity sensor 19 may be selected different from the indicated position in the liquid connection line 28 between the filtration unit 3 and the three way valve 15. In addition to the three way valve 15, the liquid connection line 28 further comprising a shut off valve 23 situated upstream of the three way valve 15 to prevent backflow, that is liquid flowing from the filtrate tank 7 or process tank 1 (via liquid connection line 29) to the cavity 6 of the filtration unit 3 through liquid connection line 28. The shut off valve 23 is a proportioning valve (or other kind of adjustable valve) and the control of its rate and extent of its opening is performed by the control system 8; the specific function of the proportioning valve 23 is typically exploited in the establishment of a filtration cake 18 when a constant flow or pressure profile is utilized as will be disclosed in further details below.

The filtrate tank 7 comprises a liquid connection line 30 with a pump 11 between the filtrate tank 7 and the cavity 6 of the filtration unit 3 whereby filtrate in the filtrate tank 7 may flow to the cavity 6. The liquid connection line 30 further comprising a shut off valve 24 to avoid back flow, that is liquid flowing from the cavity 6 and to the filtrate tank 7 through liquid connection line 30. The purpose of moving filtrate back to the cavity 6 will be disclosed below.

A liquid connection line 31 comprising a pump 10 is provided to feed supernatant or mixed liquor of higher concentration produced in the separation unit 2 into the cavity 5 of the filtration unit 3. The liquid connection line 31 further comprises a shut off valve 22 to prevent back flow, that is flow of liquid from the cavity 5 to separation unit 2 through the liquid connection line 31.

A liquid connection line 32 is provided at an outlet of the separation unit 2 for outletting activated sludge mixed liquor contained in the separation unit 2. The liquid connection 32 connects the separation unit 2 with the process tank 1 so that activated sludge mixed liquor of higher concentration may flow to the process tank 1 through a separate liquid connection line (not shown in FIG. 1) or by the liquid connection line 32 connecting an outlet of the separation unit for activated sludge mixed liquor with the liquid connection 29 as shown in FIG. 1. Thickening of the activated sludge supernatant in the separation unit 2 will take place and the liquid connection line 32 is typically designed to and performs transport of the thickened activated sludge mixed liquor back to the tank 1. This liquid is termed Return Activated Sludge mixed liquor (RAS).

The liquid connection lines between the units are typically embodied as pipes and the flow of liquids between the units is controlled by a control system 8 controlling the operation of pumps 9, 10 and 11 and the valves 12, 13, 14, 15, 16, 22, 23, 24. In addition, readouts from the pressure sensor 17, the flow meter 21 and the turbidity sensor 19 is received by the control system 8 and used in the control of the system I.

While the above disclosure focuses on the components of the system and the possibilities for liquids to flow through and between the various components, the system is typically operated in three stage (A, B and C each refers to the stages indicated in FIGS. 2a and b):

A Establishment of filtration cake
B Filtration of supernatant
C Removal of filtration cake Each of these stages will now be disclosed in further details.

A: Establishment of Filtration Cake

Activated sludge mixed liquor is pumped from the process tank 1 by pump 9 via liquid connection lines 33 and 25 and through valve 16 (in open state) into the cavity 5. During this, the valves are in the following states:

|  | Valve | | | | | | | |
| --- | --- | --- | --- | --- | --- | --- | --- | --- |
|  | 12 | 13 | 14 | 15 | 16 | 22 | 23 | 24 |
| State | Closed | Open | Closed | To 1 | Open | Closed | Closed | Closed |

This configuration of the valves provides a flow of activated sludge mixed liquor into the cavity 5. When the cavity 5 is completely filled with activated sludge mixed liquor, the valves are arranged in the following states:

|  | Valve | | | | | | | |
| --- | --- | --- | --- | --- | --- | --- | --- | --- |
|  | 12 | 13 | 14 | 15 | 16 | 22 | 23 | 24 |
| State | Closed | Closed | Closed | To 1 | Open | Closed | Regulated | Closed |

Pump 9 pumps activated sludge mixed liquor from the process tank 1 into the cavity 5 and the only way to release the pressure is for the liquid to pass the cake support 4 and escape through the liquid connection line 28 and the valve 23. Flocs, which are sufficiently large to be entrapped on the cake support, form the filtration cake 18. The valve 23 can be 100% open and then the cake establishment proceeds according to the constant pressure mode, where the pressure is decided by pump 9. Alternatively, the valve can be regulated by the control system 8 based on the readings from the flowmeter 21, so that as the filtration cake 18 grows in thickness and creates more hydraulic resistance, the valve 23 gradually opens to maintain constant flow through the cake support 4. The process ends when the cake has achieved the desired thickness, indirectly indicated by the pressure sensor 17.

The pressure difference and the volume of liquid displaced through the opening of the filtration cake support 4, control the filtration cake 18 properties, and are monitored by the differential pressure sensor 17 and a flow meter 21. When the pressure difference reaches a preset value indicating that the desired cake thickness and properties have been achieved, the valve 13 is opened and the excess activated sludge mixed liquor is pushed out of the cavity 5 by the inflow of supernatant to the cavity 5 through the valve 22 and liquid connection line 31 and back into the process tank 1. Thus, at the end of the establishment of filtration cake mode, the valves are in the following states:

|  | Valve | | | | | | | |
| --- | --- | --- | --- | --- | --- | --- | --- | --- |
|  | 12 | 13 | 14 | 15 | 16 | 22 | 23 | 24 |
| State | Open | Open | Closed | To 1 | Closed | Open | Closed | Closed |

While the above disclosure focus on a operation mode in which the filtration cake 18 is made by deposition of particles contained in the activated sludge mixed liquor contained in the process tank 1, the filtration cake may also be made by deposition of particles contained in the Return Activated Sludge mixed liquor (RAS) leaving the separation tank 2 through liquid connection line 32. This is schematically disclosed in FIG. 5B. In such embodiments the liquid connection lines disclosed in FIG. 1 are changed so that the Return Activated Sludge mixed liquor can be fed into the cavity 5 of the filtration unit 3.

B: Filtration of Supernatant

Filtration of activated sludge supernatant takes place by pumping activated sludge supernatant from the separation unit 2 and through the filtration cake 18 by means of pump 10. The quality of the filtrate is monitored by a turbidity sensor 19. If the quality is acceptable, typically meaning that the turbidity being smaller that a pre-set number, the filtrate is directed into the filtrate tank 7 through the 3-way valve 15. If the quality is not acceptable, the filtrate is directed to the process tank 1 through the 3-way valve 15. Thus, the valves are in the following states during filtration mode:

|  | Valve | | | | | | | |
| --- | --- | --- | --- | --- | --- | --- | --- | --- |
|  | 12 | 13 | 14 | 15 | 16 | 22 | 23 | 24 |
| State | Open | Closed | Closed | — | Closed | Open | Open | Closed |

C: Removal of Filtration Cake

During the filtration of supernatant stage, particles contained in the supernatant will clog the filtration cake 18. The clogging of the filtration cake is detected as an increase in pressure difference across the filtration cake 18. If continued filtering is carried out the clogging of the filtration cake 18 will as an end result have that no flow—or substantially no liquid flows through the filtration cake 18. In many instances, the result of the clogging is that the pressure grows very fast and reaches the limit of the system in the sense that the system runs out of pump capacity to generate more pressure, or the filtration cake 18 is compressed so hard that removal of it becomes very hard.

Thus, when the pressure difference across the filtration cake 18 reaches a preset level, the filtration stage is terminated and the removal of filtration cake stage initiated. The first regime of the exchange of filtration cake stage comprising removing the filtration cake 18 present on the filtration cake support 4. This is done by pumping filtrate from the filtrate tank 7 by use of pump 11 into cavity 6 of filtration unit 3. The valves are in the following states during this first regime:

| | | | Valve | | | | |
|---|---|---|---|---|---|---|---|
| 12 | 13 | 14 | 15 | 16 | 22 | 23 | 24 |
| State Closed | Open | Closed | To 7 | Closed | Closed | Closed | Open |

Filtrate is then pumped from the filtrate tank 7 through pump 11 and into the cavity 6 of the filtration unit 3 creating flow through and pressure difference across the filtration cake 18 and filtration cake support 4, separating the filtration cake from the filtration cake support 4. The released cake is then either flushed through valve 13 and back into the process tank 1 (as indicated in the above table) or through valve 14 into the reservoir for further treatment as surplus sludge.

Thus, removal of the filtration cake 18 is typically carried out by what can be characterized as back washing including a reversed liquid flow as disclosed above. Instead of such removal—or in combination thereto—filtration cake 18 or remaining elements thereof may be removed by mechanical actions such as scraping, a chemical action, a thermal action, sonication with ultrasound or other.

Once, the filtration cake is removed, the stage of establishment of a filtration cake 18 is executed out—as outlined above—resulting in that a new filtration cake is established on the filtration cake support 4.

When a filtration cake is established, the filtration of supernatant stage is executed until the exchange of filtration cake is to be carried out again. Thus, a filtration is typically carried out by a cyclic repetition of the stages: establishment of filtration cake, filtration of supernatant and removal of filtration cake.

Figure 2A:
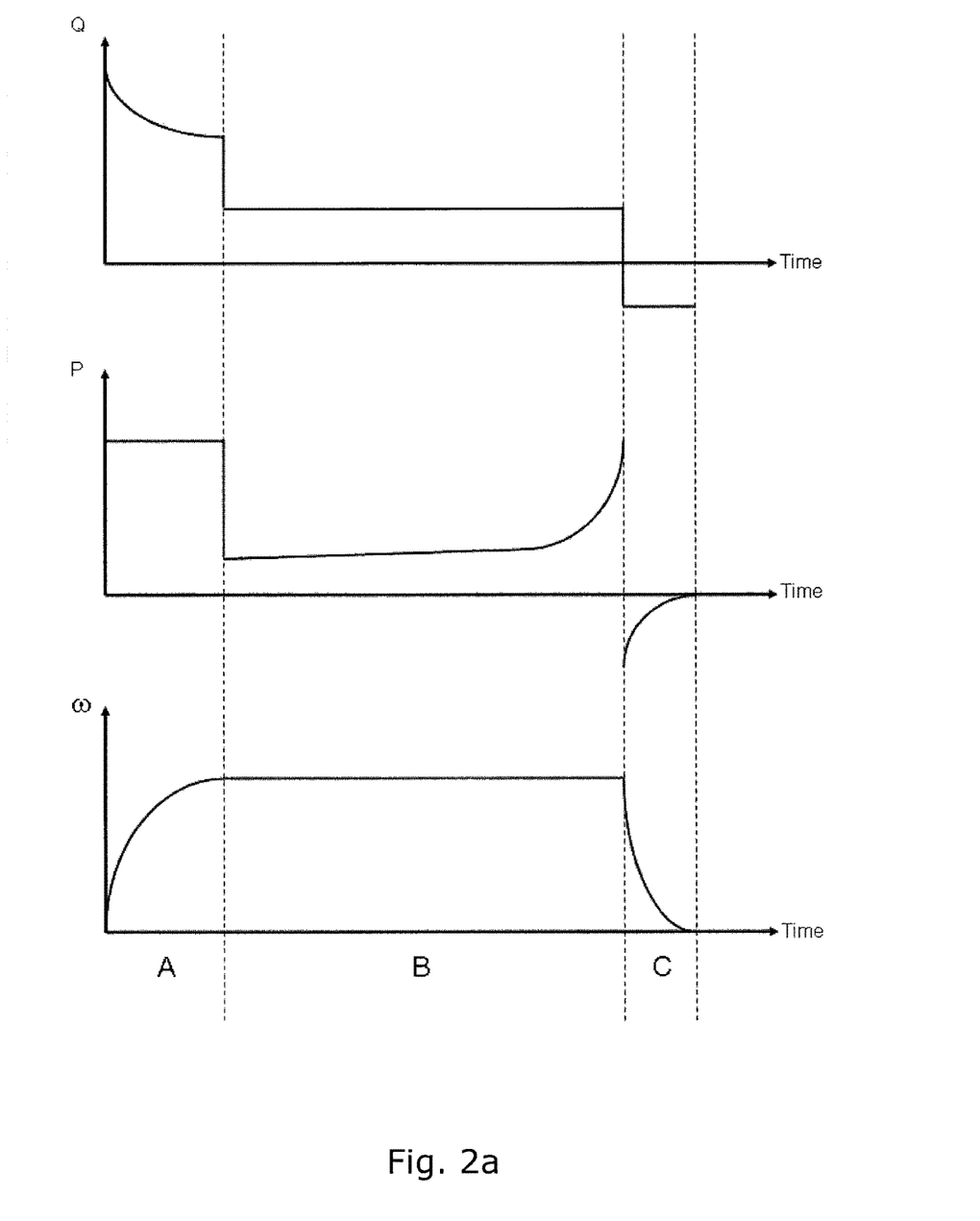
FIG. 2a shows profiles for constant pressure mode of establishment of filtration cake and FIG. 2b shows profiles for constant flow mode through the filtration cake during establishment of filtration cake.
Figure 2B:
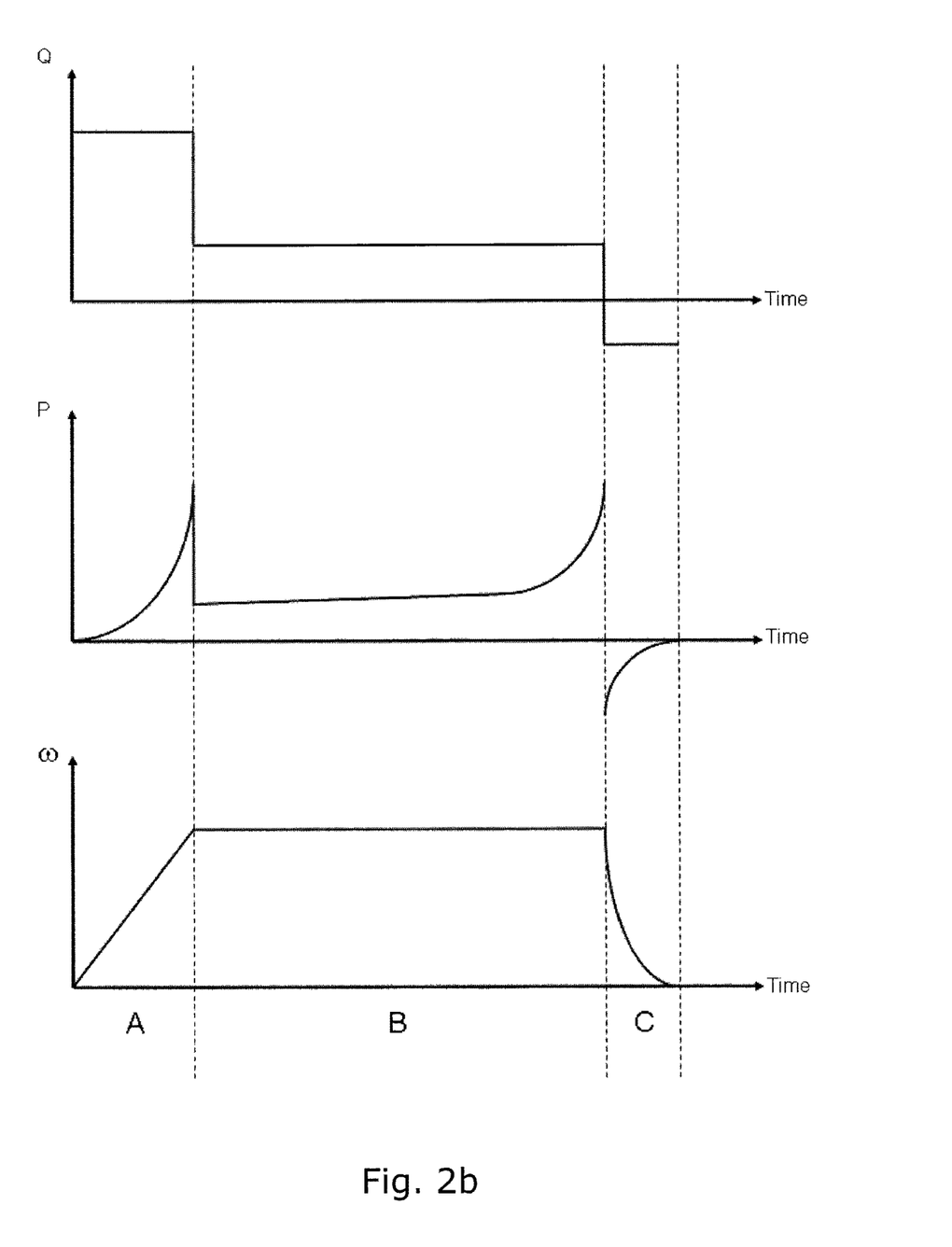

FIGS. 2*a* and *b* each shows schematically profiles for pressure, P, across the filtration cake 18 (when present) and the cake support 4, flow, Q, through the filtration cake 18 (when present) and cake support 4 and filtration cake amount in terms of dry matter, ω, (measured in kilograms of cake dry matter/unit area) (kg/m2). In this context, dry matter amount refers to the content of flocs deposited on the filtration cake support 4. FIG. 2*a* shows profiles for constant pressure mode during establishment of filtration cake and FIG. 2*b* shows profiles for constant flow mode during establishment of filtration cake. It is noted that the filtration cake dry matter amount ω may be indirectly translated into the filtration cake thickness. FIGS. 2*a* and *b* are just two examples, any combination in between is possible, in the sense that both pressure and flow can vary according to a specified profile.

As disclosed in FIG. 2*a*, the volume flow, Q, of filtrate is decreasing as function of time during the establishment of filtration cake mode A. At the same time, the pressure difference, P, across the filtration cake support 4 and the filtration cake 18 (when being established) is kept constant. This is due to the way the filtration cake is established namely by operating the pump 9 to fill the cavity 5 with activated sludge mixed liquor and feed of activated sludge supernatant into the cavity 5. As more and more activated sludge flocs deposit on the filtration cake support 4 due to the flow of liquid towards cavity 6, the amounts of dry matter deposited on the filtration cake support 4 increases resulting in an increase in flow resistance in the filtration cake 18. Because the pressure is maintained constant, the volume flow, Q, drops over time. When the cake amount reaches a pre-defined level, the filtration cake establishment stage A is terminated and the filtration stage B initiated.

During the filtration stage B, the pump 10 is operated to provide a constant flow of mixed liquor supernatant to the cavity and thereby a constant flow of filtrate out of the cavity 6. During the filtration mode, particles contained in the mixed liquor supernatant are filtered off in the filtration cake 18 and are deposited inside the filtration cake 18. The increasing clogging of the filtration cake 18 increases the pressure difference over of the filtration cake 18 with filtration cake support 4 which is shown in FIG. 2*a* as an substantial increase in pressure P at the end of filtration mode B. The end of filtration mode B is typically selected to be when the pressure P reaches a certain predefined level.

After the filtration of supernatant stage B has been terminated, the removal of filtration cake C is initiated. This involves as disclosed above a reversal of the flow through the filtration cake support so that the filtration cake 18 is removed from the filtration cake support 4 by the action of the liquid flowing through the filtration cake support 4 from cavity 6 to cavity 5. In FIG. 2*a*. this reversed flow is shown as a negative liquid flow Q, a reversed pressure difference and a decrease of dry matter ω deposited on the filtration cake support 4. It is noted that in general, the dry matter amount deposited on the filtration cake support 4 is not determined by a direct measurement and the termination of the exchange of filtration cake C is performed when the pressure difference P reaches a certain level such as less than 10 mbar. It is important to notice that backwashing the cake is only one of many ways to remove the cake from the support and clean the support—any other technique can be applied.

FIG. 2*b* shows similarly to FIG. 2*a* the various stages A, B and C. However, contrary to the mode of operating the system shown in FIG. 2*a*, the operation of the system in FIG. 2*b* involves a constant flow rate during the establishment of filtration cake mode A. This constant flow rate is provided by operating the pump 9, so as to produce a gradually increasing pressure difference P as shown in FIG. 2*b*, mode A. (or maintaining the constant speed of pump 9 and regulating the valve 23). The result compared to the embodiment of FIG. 2*a* is that the increase rates of dry matter amount deposited on the filtration cake support 4 are different. In FIG. 2*a* (constant pressure) the deposition rate changes as a function of time, whereas the deposition rate is virtually constant as function of time when the flow is kept constant (FIG. 2*b*).

Figure 3:
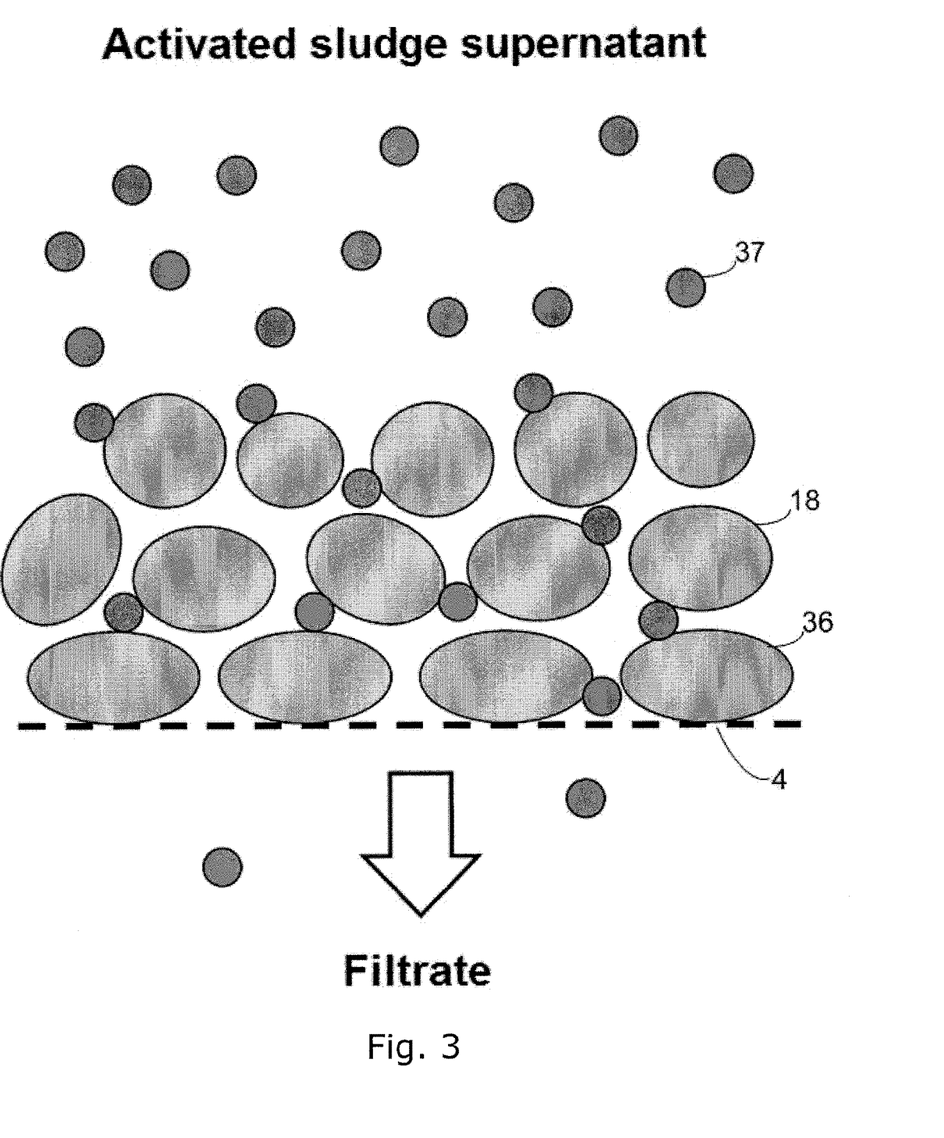
FIG. 3, shows schematically the filtration mechanism as well as the clogging of the filtration cake 18.

In FIG. 3 the filtration mechanism is schematically disclosed as well as the clogging of the filtration cake 18. The dry matter, that is activated sludge flocs, deposited on the filtration cake support 4 is shown as larger elements 36 compared to smaller elements 37 contained in the activated sludge supernatant to be filtered through the filtration cake 18. During the flow of activated sludge supernatant towards and through the filtration cake 18, and as the filtration cake 18 is a porous member some of the smaller particles will be trapped in the void left in between the flocs 36 and adsorbed to their surfaces, and some will go through the filtration cake 18. Ideally, all smaller particles will be trapped in the filtration cake. The amount of trapped particles 37 depends on the thickness of the filtration cake, as well as the porosity of the filtration cake 18 and may also depend on whether the filtration cake 18 is compressed or not; a compression of the filtration cake 18 may be performed by a increasing the pressure difference over the filtration cake and the filtration cake support.

Thus, a filtration cake 18 composed of activated sludge flocs is capable of removing the particles present in activated sludge supernatant through a process of depth filtration. Small particles 37 from the activated sludge supernatant enter the porous filtration cake 18 and get adsorbed to the surface of the activated sludge flocs forming the filtration cake 18. Adsorption of these particles contributes to the decrease of the internal porosity of the filtration cake and therefore the increase of the pressure drop across the filtration cake 18. The pressure drop P across the filtration cake 18 is additionally increased by the progressing collapse of the filtration cake caused by the compressible nature of the activated sludge flocs.

Figure 4:
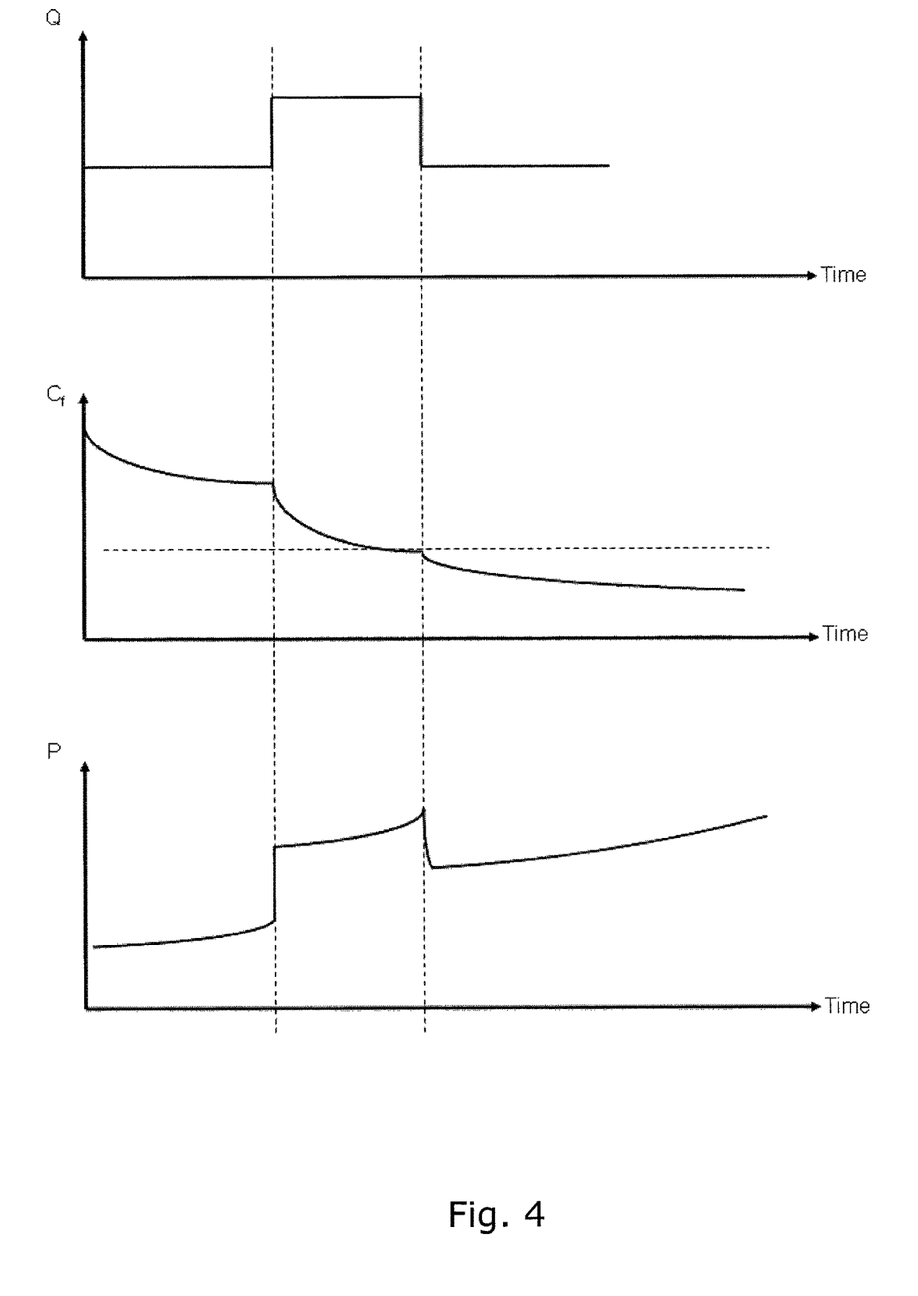
FIG. 4 shows schematically profiles for pressure, P, flow, Q, concentration of particles in the filtrate, noted as $C_f$.

The quality of filtrate (i.e. the concentration of particles in the filtrate, noted as Cf in FIG. 4) produced during the filtration stage can be monitored and controlled online. The turbidity sensor is one way of achieving the online quality measurement.

A constraint on the filtrate quality (maximum concentration of particles in the filtrate denoted by a horizontal dashed line in FIG. 4) can be set (e.g. as a turbidity less than 1 NTU, or as suspended solids concentration of less than 1 mg per liter), and a way to satisfy the constraint is to compress the cake according to a specific profile (gradually or step-wise) by increasing the flowrate through the filtration cake, which will result in gradual (or step-wise) increase in the pressure drop across the cake. This pressure drop increase will modify the filtration cake 18's porosity, and therefore its efficiency in removing the particles from the feed. When the quality constraint has been satisfied, the flowrate (flux) through the cake can be returned to the original value—the quality will remain higher due to the high degree of irreversibility of the compression process. The result will also be that the pressure drop through the cake will be higher than the original value, before the compression was made.

An advantageous self-healing effect is presented by the method and system of the present invention. If during the establishment stage, a part of the filtration cake 18 is removed, falls off or otherwise no longer forming part of the filtration cake 18, a self-repairing mechanism takes place. If a part of the filtration cake 18 is missing, lack of flocs in that part of the filtration cake 18 results in that a local region of the filtration cake 18 with less hydraulic resistance is obtained tending to attract liquid with flocs to such region resulting in the flocs will deposit in the region thereby filling the region with flocs to re-establish the filtration cake 18. Such holes in the filtration cake will be sensed by the pressure sensor as a decrease in pressure drop between the two cavities 5 and 6 as well as an increased turbidity of the liquid measured by the turbidity sensor 19. If a large penetration is detected in the cake during operation (filtration stage), dosing of activated sludge mixed liquor may be performed to mend and complete the cake.

Figure 5A:
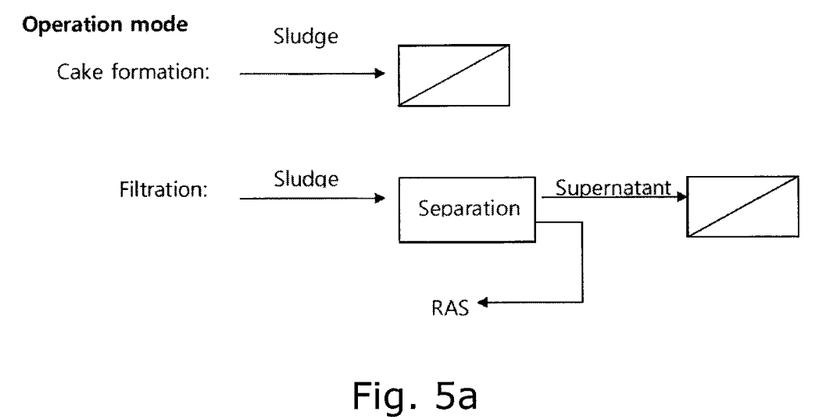
FIG. 5 indicates two different modes of operation with respect to separation and filtration and in particular to biomass separation and filtration.
Figure 5B:
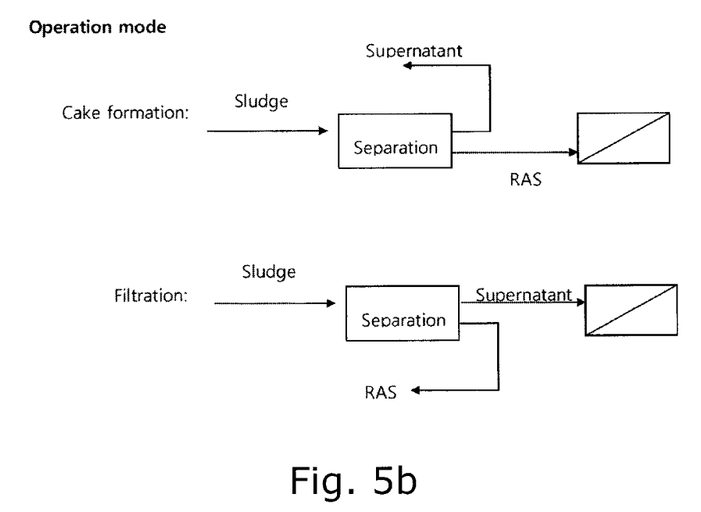

FIGS. 5A and B indicate two different operation modes of preferred embodiments of the invention. In FIG. 5, a filter (that is a combination of a filtration cake support (4) and a filtration cake (18)) is indicated by a box with a line connecting two corners as used ordinary to a skilled person, and the filtration cake 18 is preferably provided by activated sludge flocs present either in Return Activated Sludge, that is mixed liquor with a higher concentration e.g. as leaving the separation unit 2 through liquid connection line 32 or activated sludge mixed liquor from process tank 1. FIGS. 5A and 5B further comprise means for separating out flocs and/or other solid elements contained in the sludge before the activated sludge supernatant is displaced through the filtration cake 8.

FIG. 5A indicates an operation mode in which formation of the filtration cake (18) is done via the activated sludge mixed liquor, that is the filtration cake 18 is made by deposition of particles on the filtration cake support (4) from the liquid to be filtered. Before filtration, the activated sludge mixed liquor is separated into two fractions: one fraction containing the mixed liquor of higher concentration labelled RAS (Return Activated Sludge) and one fraction containing non-settling particles and treated water labelled activated sludge supernatant. Thus, two fractions are provided: one fraction containing solid particles above certain size (RAS) and one containing smaller solid particles (activated sludge supernatant). For filtration, only activated sludge supernatant is moved through the filtration cake 18, while RAS is moved back to the region in which biodegradation occurs.

FIG. 5B indicates another operation mode 3 which sludge is separated into two fractions: one fraction containing solid particles above certain size (RAS) and one containing smaller solid particles (activated sludge supernatant). Only RAS is moved to the filter element 5 for formation of the filter cake 18. Activated sludge supernatant is moved back to the region in which biodegradation occurs, or into a separate chamber (not shown). For filtration, only activated sludge supernatant is moved through the filtration cake 18, while RAS is moved back to the region in which biodegradation occurs (process tank 1).

In addition to formation of the filtration cake 18 from activated sludge flocs, the filtration cake 18 may be formed by coagulated substances provided by adding a coagulant to the activated sludge mixed liquor. A combination of activated sludge flocs and coagulated substances for formation of the filtration cake may also be within the present invention.

Sludge Dewatering

The present invention furthermore provides the possibility of dewatering activated sludge in the filtration setup disclosed above. The valve 14 and the reservoir 20 of FIG. 1 are designed inter alia to remove and capture the used filtration cake 18 which has been loaded with particles and compressed during operation. The filtration cake 18 is typically so compressed and solidified that its water content is similar to what can be achieved in sludge dewatering devices, such as belt presses, filter presses and centrifuges, whereby additional equipment for sludge dewatering may not be required in systems and methods according to the present invention if the used filtration cake is captured instead of feeding the material of the used filtration cake 18 to the process tank 1.

Experimental Results

The pressure difference across the filtration cake support 4 and the solid particles deposited thereon during establishment of the filtration cake 18 is typically between 0 and 200 mbar and the pressure difference across the filtration cake 18 and the filtration cake support 4 during operation is typically up to 200 mbar. However, the pressure levels is often setup limitations and may be different. However, pressure levels above 1 bar is at present not found reasonable.

Fluxes (flow of liquid through the filtration cake divided by the area of the filtration cake) being achieved are in the range of 100 to 2000-3000 LMH (liters per square meter per hour). It has been found that higher flux results in a shorter filtration cake lifetime (lifetime before clogging to an extend prompting exchange). Filtration cakes 18 usually live from 5-15 minutes (high fluxes, e.g. 1500-2000 LMH) to several hours (e.g. 5 hours at 300 LMH), but it has also been observed that it depends on sludge properties and the particle concentration in the supernatant.

Figure 6:
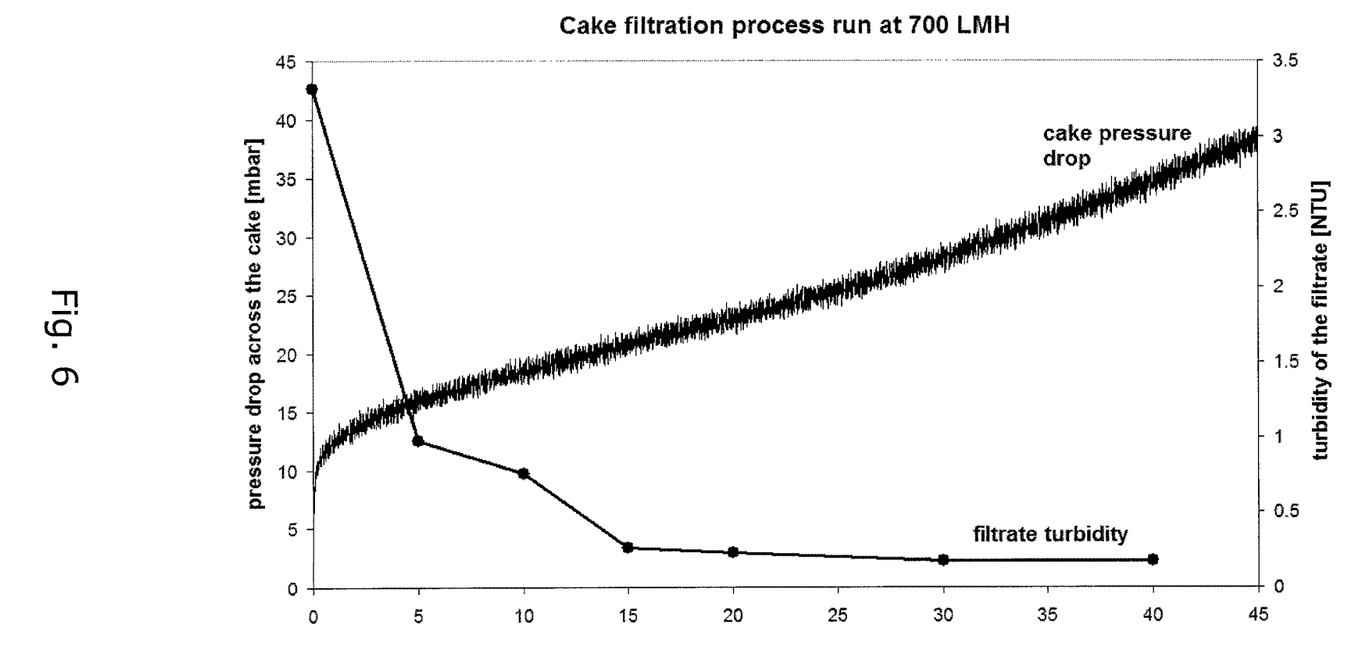
FIG. 6 presents an exemplary cake filtration process run performed at the flux of 700 LMH (liters per square meter per hour).

FIG. 6 presents an exemplary cake filtration process run performed at the flux of 700 LMH (liters per square meter per hour). The cake filtration process run is carried out with the embodiment shown in FIG. 1. The turbidity of the filtrate was measured several times during the process in order to track the improving efficiency of the filtration cake in terms of particle removal and to demonstrate the quality of filtrate produced by the present invention. The process run was terminated when the pressure drop across the filtration cake reached 40 mbar.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for filtering an untreated waste water liquid or an activated sludge mixed liquor liquid, which contains solid particles of different sizes, comprising:
    establishing a filtration cake at least partly from activated sludge flocs contained in said untreated waste water liquid or said activated sludge mixed liquor liquid, wherein said activated sludge flocs are deposited on a filtration cake support being a porous member that allows liquid to flow through the filtration cake so as to provide a filtrate,
    separating the untreated waste water liquid or said activated sludge mixed liquor liquid containing solid particles of different sizes into fractions, wherein one fraction contains solid particles above a certain size and one fraction consisting essentially of smaller solid particles, wherein the fraction containing solid particles above a certain size comprises the activated sludge flocs, and,
    providing a flow of the fraction consisting essentially of the smaller solid particles towards and through the formed filtration cake in a direction towards and through the cake support, thereby providing a filtering of the fraction consisting essentially of the smaller solid particles.

2. The method according to claim 1, wherein the filtration cake is made by deposition of particles on the filtration cake support from the untreated waste water liquid or said activated sludge mixed liquor liquid containing solid particles of different sizes.

3. The method according to claim 1, wherein the filtration cake is made by deposition of particles on the filtration cake support from the fraction of the untreated waste water liquid or said activated sludge mixed liquor liquid containing solid particles of different sizes, which contains solid particles above a certain size.

4. The method according to claim 1, wherein the untreated waste water liquid or said activated sludge mixed liquor liquid containing solid particles of different sizes is activated sludge mixed liquor and the fraction consisting essentially of the smaller solid particles is activated sludge supernatant.

5. The method according to claim 4, wherein the activated sludge mixed liquor is activated sludge mixed liquor from a biological waste water treatment process.

6. The method according to claim 4, wherein the activated sludge supernatant is provided by settling an activated sludge mixed liquor or a biologically treated municipal or industrial waste water present in a system treating municipal or industrial waste water.

7. The method according to claim 4, wherein the filtration cake is provided by the activated sludge flocs contained in the activated sludge mixed liquor and coagulated substances provided by adding a coagulant to the sludge.

8. The method according to claim 1, wherein the filtration cake is formed on a backing layer on the cake support, wherein the backing layer comprises a paper or a net, having a pore size that allows filtrate to pass through while allowing build-up of the filtration cake, and wherein the cake is removed together with the backing layer.

9. The method according to claim 1, further comprising removal of the filtration cake, wherein the removal comprises providing a flow of liquid through the cake support directed towards the filtration cake.

10. The method according to claim 1, further comprising removal of the filtration cake or residues thereof by: a mechanical action, a chemical action, a flow of air bubbles, a thermal action, or a sonication with ultrasound or by a means for separating the cake from the support.

11. The method according to claim 9, further comprising returning the removed filtration cake to a process tank containing activated sludge mixed liquor.

12. A method according to claim 1, wherein establishing the filtration cake comprises:
    providing a flow of untreated waste water liquid or said activated sludge mixed liquor liquid towards the filtration cake support, wherein the untreated waste water liquid or said activated sludge mixed liquor liquid comprises solid particles of different sizes or the untreated waste water liquid or said activated sludge mixed liquor liquid is a fraction that contains solid particles above a certain size; and
    providing a pressure difference across the filtration cake support and the activated sludge flocs when deposited thereon, so as to provide a flow of untreated waste water liquid or activated sludge mixed liquor liquid through the filtration cake support and the activated sludge flocs deposited thereon until a filtration cake has been formed.

13. The method according to claim 12, wherein establishing the filtration cake further comprises:
    flushing a region in front of the filtration cake by the fraction consisting essentially of the smaller solid particles thereby removing the untreated waste water liquid or said activated sludge mixed liquor liquid used during establishing the filtration cake in order to prevent further cake growth.

14. The method according to claim 12, wherein the pressure difference across the filtration cake support and the activated sludge flocs when deposited thereon during establishing the filtration cake is below 1 bar.

15. The method according to claim 12, wherein the pressure difference during establishing the filtration cake is constant over time, or the flow of untreated waste water liquid or said activated sludge mixed liquor liquid through the filtration cake and filtration cake support during establishing the filtration cake is constant over time, or both flow and pressure change over time according to a predefined profile.

16. The method according to claim 12, wherein the filtration cake is defined to have been formed when the mass of solids per unit area of the cake support has reached between 0.05 to 10 kg dry solids per square meter.

17. The method according to claim 12, wherein the pressure difference across the filtration cake support and the activated sludge flocs when deposited thereon during establishing the filtration cake is increased over time.

18. The method according to claim 17, wherein the filtration cake is defined to have been formed, when the pressure difference has reached a preselected level.

19. The method according to claim 1, further comprising determining, one or more parameters, selected from the group consisting of turbidity, suspended solids concentration, total bacteria count, total organic carbon concentration, and chemical oxygen demand (COD) of the untreated waste water liquid or said activated sludge mixed liquor liquid having passed through the cake support and the filtration cake, wherein the determining is done by measuring and/or calculating.

20. The method according to claim 1, further comprising capturing the filtration cake or the particles thereof after it has been used for filtering the fraction consisting essentially of the smaller solid particles and removing it, from a waste water treatment system as surplus activated sludge.

21. The method according to claim 1, wherein the method of filtration comprises a cyclic repetition of:
   establishing the filtration cake,
   filtering of the fraction consisting essentially of the smaller solid particles, and
   removal of the filtration cake.

22. The method according to claim 1, wherein the method forms part of a waste water treatment system.

23. The method of claim 1, wherein establishing the filtration cake comprises providing:
   a flow of liquid toward the filtration cake support, the liquid being the activated sludge mixed liquor containing solid particles of different sizes, and
   a pressure difference across the filtration cake support, to provide a flow of liquid through the filtration cake support until the filtration cake has been formed.

* * * * *